Feb. 13, 1973  A. WEISSTUCH ET AL  3,716,460
METHOD FOR DETERMINING CORROSION RATE AND METER THEREFOR
Filed June 21, 1971  3 Sheets-Sheet 1

INVENTORS
AARON WEISSTUCH,
CHARLES E. SCHELL III, &
PAUL C. DRYDEN
BY Alexander D. Ricci &
Nicholas J. Aquilino
ATTORNEYS

INVENTORS
AARON WEISSTUCH,
CHARLES E. SCHELL III, &
PAUL C. DRYDEN

United States Patent Office 3,716,460
Patented Feb. 13, 1973

3,716,460
METHOD FOR DETERMINING CORROSION RATE AND METER THEREFOR
Aaron Weisstuch, Philadelphia, Charles E. Schell III, Levittown, and Paul C. Dryden, Philadelphia, Pa., assignors to Betz Laboratories, Inc., Trevose, Pa.
Filed June 21, 1971, Ser. No. 154,770
Int. Cl. G01n 27/26
U.S. Cl. 204—1 T     13 Claims

ABSTRACT OF THE DISCLOSURE

A three electrode corrosion rate meter including a potentiostat for providing a corrosion rate current wherein a capacitor is used to measure, store and program to the potentiostat the potential difference between the test and reference electrodes.

BACKGROUND OF THE INVENTION

The present invention relates to a three electrode corrosion rate meter.

Corrosion rate meters are commercially available which employ "linear polarization" electrochemical kinetics. About 15 years ago an experiment was reported wherein a test electrode made of the metal or alloy whose instantaneous corrosion rate was to be determined was placed in a corrodent bath, along with reference and auxiliary electrodes. By connection to a D.C. power supply, a switch, and an ammeter in series with the test and auxiliary electrodes, electrolyzing current was passed through these electrodes. The potential difference between the test and reference electrodes was measured by means of a high input impedance voltmeter. Then by measuring the open-circuit potential of the test coupon with respect to the reference electrode with the switch in its open position, and with the switch in closed position, providing a small polarizing current from the power supply to polarize the potential of the test electrode, it was found, if the polarizing current was small so the polarizing potential was less than 15 millivolts, the ratio of the polarizing potential to the polarizing current, known as the polarization resistance, was inversely proportional to the corrosion rate. It then follows for a given system of metal and corrodent, that if the polarizing potential is always the same value and therefore the corrosion rate will be directly proportional to the external current required to polarize the electrode.

For any corroding electrode the polarizing potential and current are interrelated, so the corrosion measurements may be accomplished using two different approaches. The first is the galvanostatic method, wherein the magnitude of the polarizing current is fixed at some preselected value and the polarization of the test electrode is measured. In a modified galvanostatic operation, the polarizing current is varied until the polarizing potential reaches a preselected value.

The second method is called the potentiostatic method wherein the preselected polarization value is impressed on the test electrode by means of an instrument called a potentiostat. This is accomplished by supplying just the right amount of polarizing current to the test and auxiliary electrodes. The reference electrode is undisturbed and serves only as a means by which the potential of the test electrode may be measured.

The results obtained by both methods are equivalent. Prior to the advent of solid-state operational amplifiers, the modified galvanostatic method was preferred because it utilized a vastly simpler electronic circuitry. This method, however, does not lend itself to automated operation because, the open-circuit corrosion potential must be accurately measured and/or nulled to zero, which requires an accurate, high impedance electronic voltmeter and the operator must then manually adjust the polarizing current supply so the proper value of polarizing voltage is obtained. These steps could be automated only at a considerable increase in circuit complexity.

The potentiostatic method also requires the open-circuit corrosion potential to be measured, with respect to a reference electrode, with an accurate, high impedance electronic voltmeter. This value must be programmed into the potentiostat, along with the desired value of the polarization voltage. The potentiostat circuit must be then activated and the polarizing current measured.

U.S. Pats. 3,069,323, 3,156,631 and 3,250,689 cover a series of commercially available corrosion testing instruments. A portable instrument covered under the above patents operates on the two electrode principle using the linear polarization theory. In order to simplify the circuitary, the auxiliary electrode in this instrument also functions as the reference electrode. With this method, completely identical test and auxiliary electrodes are required and, in order to obtain a measurement, a polarizing potential from the power supply is placed across the electrodes, in series with an ammeter which measures the polarizing current. Since a reference electrode is not provided, the amount of polarization each electrode experiences cannot be measured; and it is assumed that if both electrodes are identical; both electrodes will be corroding at the same open-circuit potential; and both electrodes will polarize equally. Practically this does not happen, and the instrument provides a means of reversing the polarity of the applied potential to provide an average polarizing current by computation. This average current rate then must be converted into a corrosion rate only by knowing the electrolytic conductivity or resistivity of the electrolyte, which, in general, requires another instrument. This arrangement also results in an IR drop in the electrolyte, which depends upon the solution resistivity. Therefore, unless the resistivity of the solution as well as the average polarizing current are known, the true polarization of the electrodes cannot be determined. Because of the variance in these values, the corrosion rate cannot be determined directly, but a series of calibration curves are needed.

This type of instrument may also be modified for three electrode operation to eliminate the IR drop/solution conductivity factor which necessitated the use of calibration graphs. Such a system employs a non-adjustable potentiostatic system using test and reference electrodes of the same material. The instrument alternately polarizes the test electrode ±10 mv. from the reference electrodes' corrosion potential and the current flowing between the test and auxiliary electrodes is measured by means of an ammeter. No current is drawn from the reference electrode.

This system is known as a modified system because, unlike a true 3 electrode potentiostat system, the test electrode is polarized ±10 mv. away from the reference electrodes open-circuit corrosion potential and because the test and reference electrodes may have different open-circuit corrosion potentials, the polarization is not constant and although some of the complications due to IR drops are reduced, many of the two electrode problems remain.

A corrosion meter, covered by U.S. Pat. No. 3,406,101 is marketed as a portable or fixed station instrument. The portable instrument uses a modified galvanostatic method which requires a manual reading of the potential difference between the test and reference electrodes. This difference is nulled to zero and polarizing current is then applied to the test and auxiliary electrodes and adjusted until the potential difference between the test and reference electrodes is ±10 mv. The current required is measured on a built-in ammeter calibrated in units of corrosion rate. However, zero nulling is required, a voltmeter must be used and the test and reference electrodes must be identical.

SUMMARY OF THE INVENTION

The present invention relates to a corrosion meter of the potentiostatic type having novel circuitry to eliminate the disadvantage of the prior art devices.

The corrosion meter eliminates the requirement of a high-input impedance voltmeter; the need for a zero-nulling or calibration procedure and the need for identical test and reference electrodes.

The corrosion rate meter of the present invention operates on the three electrode, potentiostatic method and includes a capacitor for providing the corrosion potential between the corroding and reference electrodes.

Among the objects of the present invention are; the provision of a corrosion meter which eliminates the need for a high-input impedance voltmeter and the need for identical test and reference electrodes; the provision of a corrosion meter wherein constant amounts of polarization are imparted to the test electrode, the provision of a corrosion meter wherein the electrodes remain undisturbed from their natural conditions except when a measurement is being made, the provision of a corrosion meter which does not require averaging or electrochemical approximations and where conductivity is not a factor; the provision of a corrosion meter wherein solution conductivity is not a factor; the provision of a corrosion meter wherein meters and recorders may be calibrated directly in units of corrosion rate; the provision of a corrosion meter wherein ordinary laboratory reference electrodes may be used; and the provisions of a corrosion meter wherein manual operation is minimal and the circuitry lends itself to automation.

Other objects and a further understanding of the invention may be had by referring to the following description and claims, taken in conjunction with the accompanying drawings.

BRIEF DESCRIPTION OF DRAWING FIGURES

DESCRIPTION OF THE PREFERRED EMBODIMENTS

Figure 1:
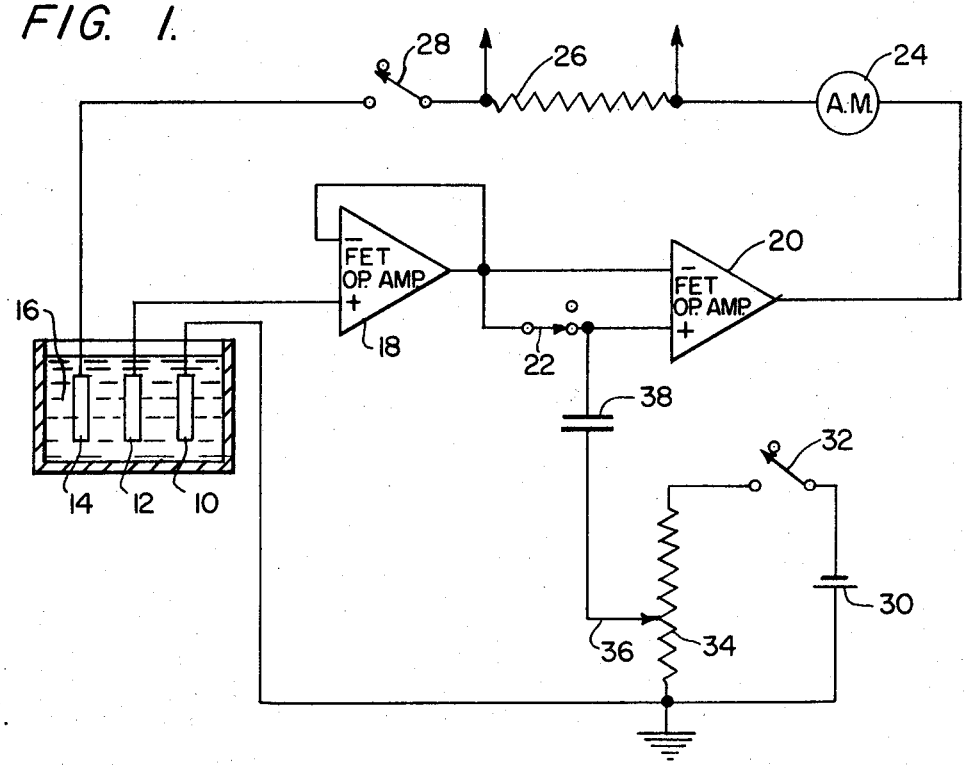
FIG. 1 is a schematic diagram of the circuit of the corrosion meter of the present invention.

The corrosion meter of the present invention operates on the three electrode potentiostatic method whereby polarization resistance, or $\Delta E/\Delta I$, is measured by changing the electrochemical potential of a freely corroding test electrode (measured with respect to a reference electrode) by a small, fixed amount and measuring the amount of current required to effect this polarization. This method provides an instantaneous corrosion rate.

As with known three electrode potentiostatic instrument the present invention uses a test electrode, reference electrode and an auxiliary electrode to complete the electric circuit through the conductive electrolyte to the test electrode. The potentiostat, which is used to provide the preselected polarization voltage which is impressed on the test voltage, utilizes one solid-state operational amplifier. In the present arrangement, the potentiostat is electrically isolated from the electrodes except when a measurement is being made to provide a freely corroding condition with a stable open-circuit potential for the test electrode.

The improvement underlying the present invention lies in the method by which the potential difference between the test and reference electrodes is measured, stored and programmed into the potentiostat. The test versus the reference potential is placed across a low leakage capacitor which takes place of the high input impedance voltmeters of other instruments.

The capacitor reproduces exactly the test to reference voltage and has the ability to remain charged and store this potential once the potential source has been removed. During a measurement operation, the capacitor is disconnected from the electrodes by means of a switch in such a way that the test/reference open-circuit potential remains on the capacitor. This potential is then placed in series with the polarizing potential which is derived from a battery/voltage divider circuit. The resulting potential, consisting of the open-circuit potential plus or minus the polarizing potential, is fed into the potentiostat, where it represents the value of potential to which the test electrode is to be polarized when the potentiostat circuit is completed. When the potentiostat circuit is completed, the potentiostat supplies the polarizing current necessary to maintain the polarization voltage. This current is directly proportional to the corrosion rate, thereby permitting direct calibration of the ammeter in corrosion rate values.

In addition to the advantages outlined above of remaining charged at the exact test/reference potential, the capacitor provides several other advantages. Capacitors are much cheaper than high input impedance voltmeters. The polarity of the voltage may be of either polarity and since small capacitors require very little charge, the current drawn by the capacitor from the reference electrode is negligible and does not cause the reference electrode to polarize and once the capacitor is charged to the test/reference potential, no current at all is drawn.

A simplified circuit of a corrosion meter employing the above described features is shown in FIG. 1. A corroding electrode 10, a reference electrode 12 and an auxiliary electrode 14 are shown immersed in a conductive solution 16. The reference electrode 12 is connected to the positive input of a voltage follower field effect transistor operational amplifier 18 the output of which is fed to a potentiostat field effect operational amplifier 20 through one contact 22 of a three pole switch. The switch may be programmed by a motor driven cam and micro switch arrangement (not shown). The output of the second operational amplifier 20 is fed through an ammeter 24, which is optional but which, when used, is calibrated in units of corrosion rate. In series with ammeter 24 is a standard resistor 26 across which is placed a recorder (not shown) which also may be calibrated in corrosion rate units. The remainder of the circuit loop includes a second contact 28 of the three pole switch and the auxiliary electrode 14 which is immersed in the solution 16.

The corroding electrode 10, which is made of a material whose corrosion rate is to be tested is connected to a voltage divider circuit comprising a battery power source 30, the third contact 32 of the three pole switch and a variable resistor 34. The voltage tap 36 of the resistor 34 is connected to a low leakage capacitor 38 which in turn is connected to the positive input of amplifier 20 at contact 22.

In the open-circuit position, shown in FIG. 1, the potentiostat is disconnected from the corrosion cell at switch contacts 22 and 28. This enables the corrosion test electrode 10 to corrode freely and establish a free corroding potential. The voltage follower 18 is operated and charges the capacitor 38 to the same potential as the freely corroding electrode 10. Since the portion of the variable resistor 34 in the circuit at this time is small, the time constant for charging the capacitor 38 is short. The polarizing potential is disconnected from the divider by the open switch contact 32.

In the closed-circuit position, switch contacts 22, 28 and 32 are moved to their opposite position from those shown. This places the voltage follower amplifier 18 in the circuit with the reference electrode 12. The polarizing voltage of ±10 mv. from the voltage divider is added to the voltage on the capacitor to provide the reference voltage source to the potentiostat amplifier 20. Since the amplifier maintains a high resistance the capacitor 38 cannot discharge and it retains the potential established between the corroding test electrode 10 and the reference electrode. The potential measuring circuit is removed by the opening of switch contact 22 in the voltage follower amplifier-reference electrode circuit.

The potentiostat circuit is completed through switch contact 28 enabling the current to be read directly in terms of corrosion rate on the ammeter 24 or the recorder.

The switches 22, 28 and 32, as mentioned hereinabove, may take the form of a relay and be programmed differently for different applications by changing the speed of a motor driving the cam which actuates the microswitch or the cam may be changed to alter the time periods the relay switches are open or closed.

Figure 2:
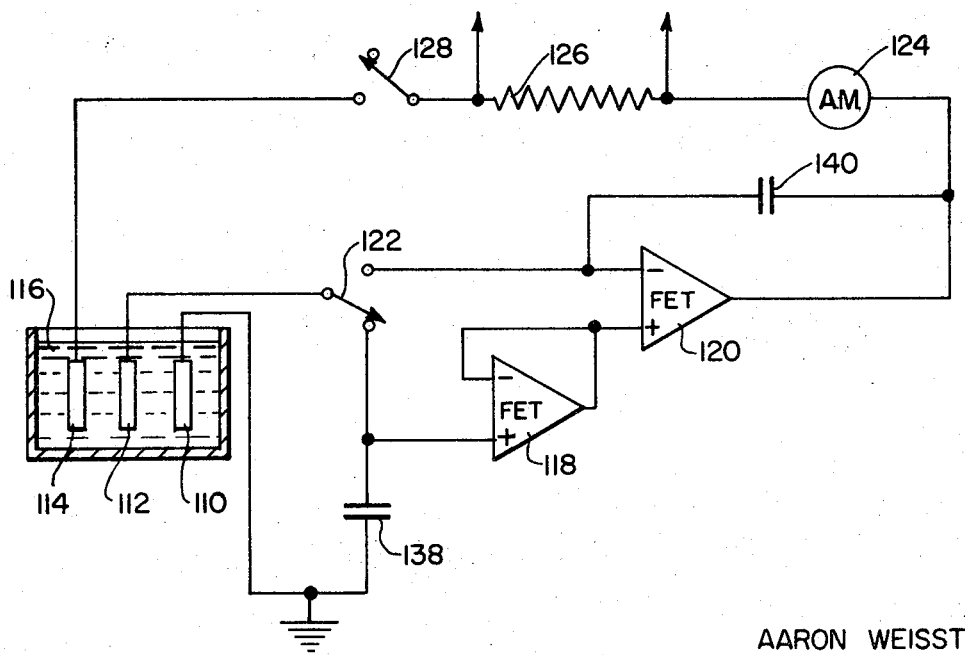
FIG. 2 illustrates an embodiment of the invention.

FIG. 2 illustrates an embodiment of the corrosion rate meter. This circuit embodiment is designed to enable the battery polarizing voltage supply to be removed. This is accomplished by setting the voltage follower offset voltage to provide the ±10 mv. polarizing voltage. In the open-circuit position, the test corroding electrode 110 is connected in a grounded series loop including a capacitor 138, a switch contact 122, and a reference electrode 112. A voltage follower amplifier 118 is connected between the capacitor 138 and the positive input of a potentiostatic amplifier 120. A capacitor 140 is connected across the negative input and output of amplifier 120. The output of the potentiostatic amplifier is connected in a circuit including ammeter 124, the recorder resistor 126, a switch contact 128 and the auxiliary electrode 114.

As with the operation of the basic corrosion meter circuit described above, the potential between the reference and test electrodes is built up on the capacitor 138. This potential is then added to the voltage follower amplifier which is off-set the ±10 mv. When a measurement is to be taken the switch contacts 122 and 128 are closed and the capacitor potential and polarizing voltage are placed into the potentiostatic amplifier 120 and the corrosion rate is read on the ammeter 124 or recorder as above.

Figure 3:
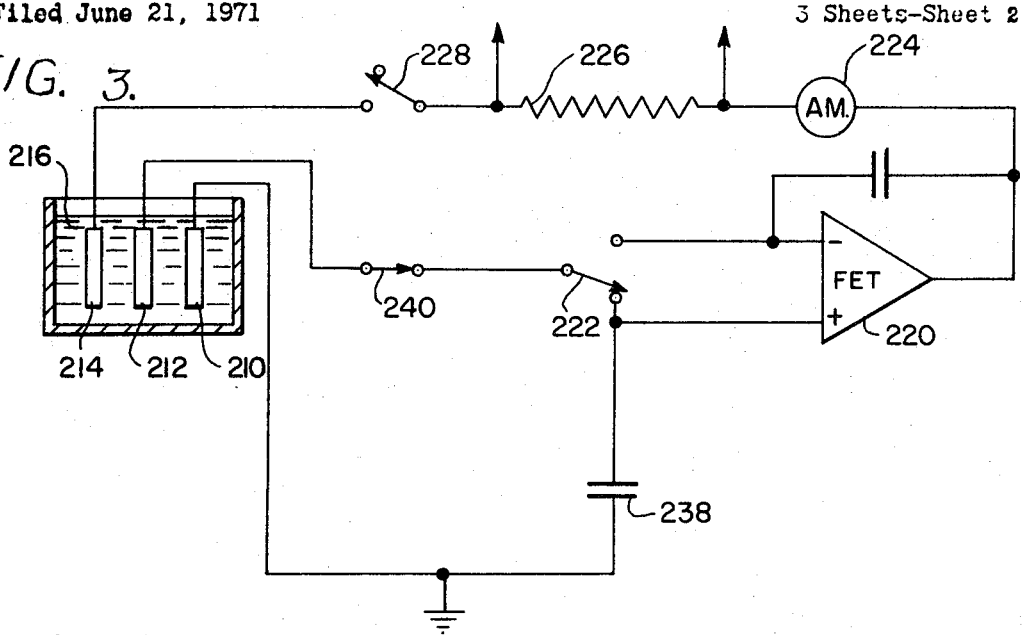
FIG. 3 illustrates a second embodiment of the invention.

FIG. 3 illustrates another embodiment of the corrosion rate meter wherein the circuit is simplified by removing the voltage follower amplifier. Here a grounded closed loop is formed of the test corroding electrode 210, a capacitor 238, a switch 222, a switch 240 and a reference electrode 212. A potentiostatic amplifier 220 is connected in a circuit with an ammeter 224, recorder resistor 226 and switch 228 in series with the auxiliary electrode 214. In this embodiment it is only necessary that the switch 222 and the switch 228 be closed so as to complete the corrosion current circuit and to open the capacitor potential circuit. In this embodiment it is also required to off-set the potentiostatic amplifier ±10 mv.

Figure 4:
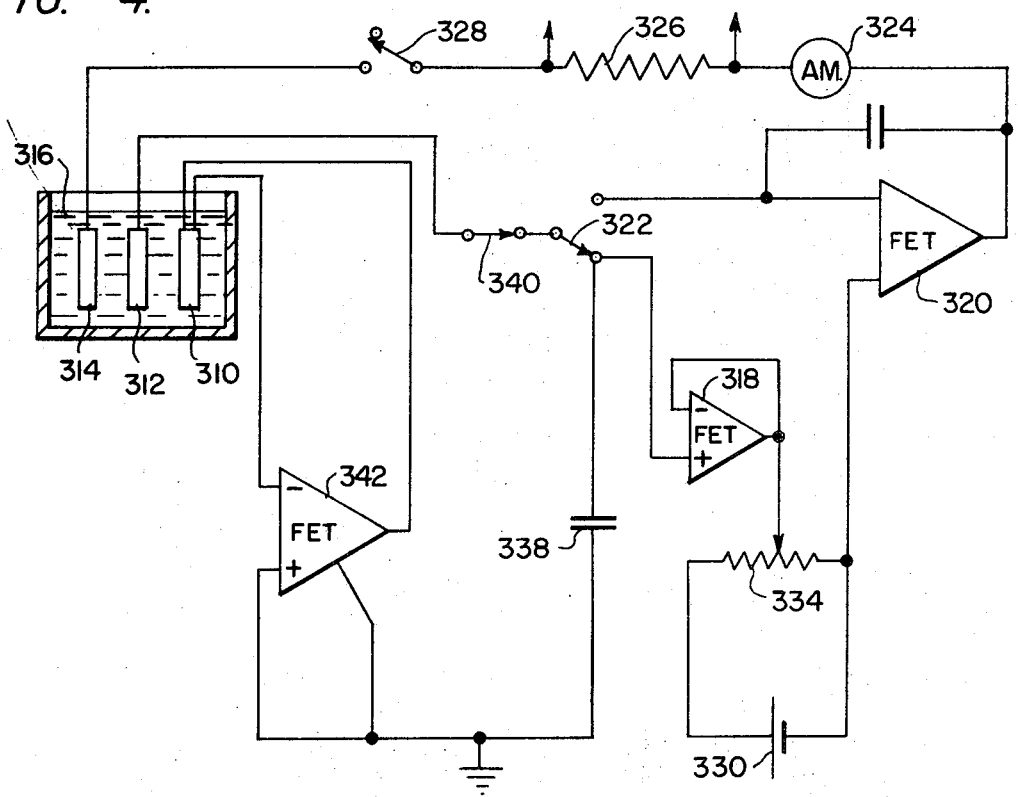
FIG. 4 illustrates a third embodiment of the invention.

A third embodiment, illustrated in FIG. 4, is directed to a portable corrosion rate meter. In this embodiment the corroding electrode 310 reference electrode 312 and auxiliary electrode 314 are provided in a separate assembly connected at the end of an elongated cable. In this embodiment, in addition to the normal circuit components, a voltage sensor amplifier 342 is provided connecting between the test electrode 310 and ground. The output of this amplifier 342 includes a feedback path to the test electrode 310. As with the other embodiments a closed loop circuit is provided including a capacitor 338, a switch 322, a switch 340 and the reference electrode 312. A polarizing voltage supply is provided including a battery 330 and a voltage divider resistor 334. Connected between the capacitor 338 and the variable tap of the resistor 334, is a voltage follower amplifier 318. A potentiostatic amplifier 320 is connected in series with an ammeter 324, recorder resistor 326, a switch 328 and the auxiliary electrode 316.

This embodiment operates in a manner similar to that described above in that the potential between the corroding and reference electrode is built up on the capacitor 338, added to the polarizing voltage and in turn to the potentiostatic amplifier circuit to provide the corrosion rate current upon switching of the switches 322 and 328.

Figure 5:
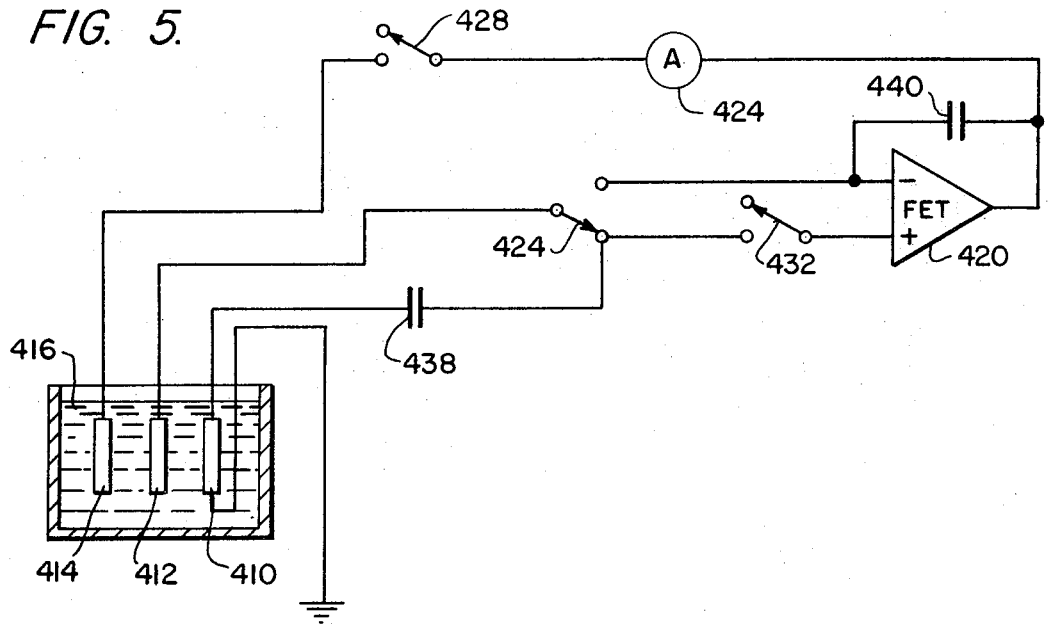
FIG. 5 illustrates a fourth embodiment of the invention.

FIG. 5 illustrates a further modification of the portable instrument having an automatic IR compensation. In this embodiment also, the corroding electrode 410, reference electrode 412 and auxiliary electrode 414 are provided in a separate assembly at the end of an elongated cable. The corrosion electrode 410 is grounded and connected to capacitor 438. A circuit loop is completed through switch 422 and the reference electrode 412. The negative input of a potentiostatic amplifier 420 is connected to the reference electrode 412 through the normally open contact of switch 422 and the positive input is connected, through series switch 432, normally closed contact 422 and capacitor 438 to the corrosion electrode 410.

Capacitor 440 is connected between the output of amplifier 420 and its negative input. In series with the amplifier 420 is an ammeter 424, switch 438 and the auxiliary electrode 414.

The input leads of the potentiostatic amplifier 420 are offset to provide the ±10 mv. polarization potential. Moving the switches 422, 428 and 432, which are ganged, to the normally closed position provides the reading of corrosion rate as with the previous embodiments.

The unique grounding system of the test electrode eliminates the need for a remote sensing amplifier. The IR drop generated in the cable between the probe and the grounding point is, in effect, added to the control voltage across the storage capacitor and thus the effect of the IR drop losses is negated automatically.

Figure 6:
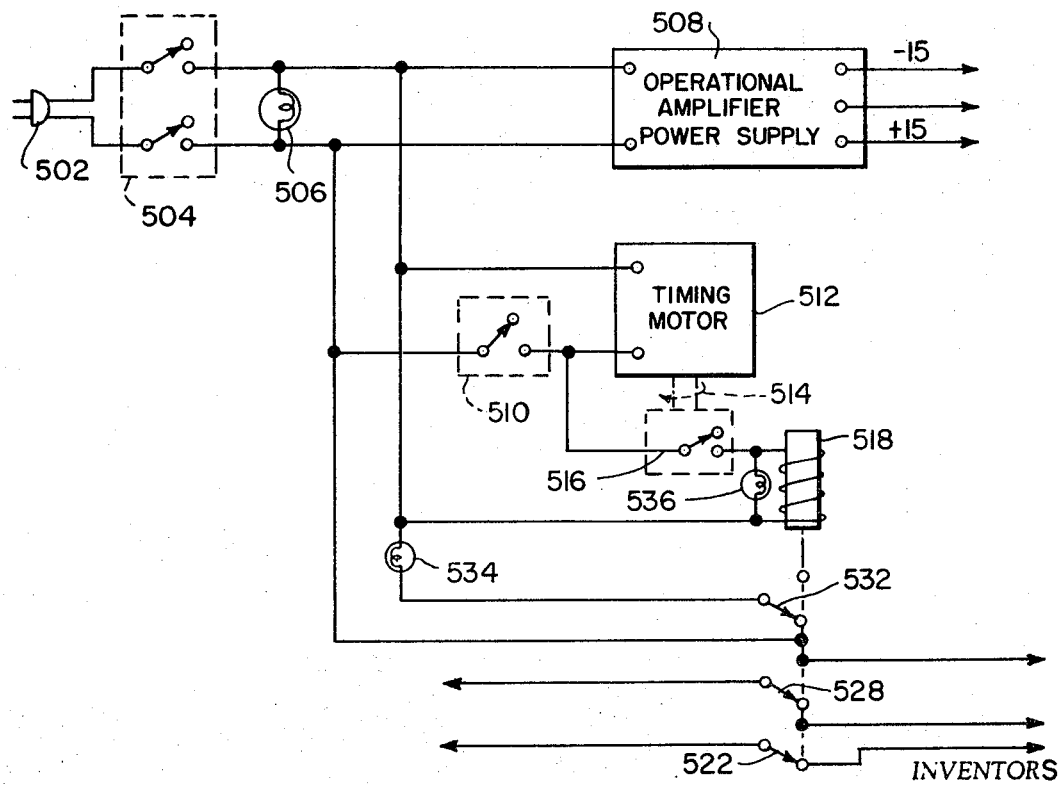
FIG. 6 illustrates a schematic diagram of a power supply for use with the corrosion meter.

FIG. 6 illustrates a typical A.C. wiring diagram for use with the corrosion rate instruments described above. A supply plug 502 is connected to a 110 v. A.C., 60 cycle source of supply to operate the system. A double pole, single throw switch 504 and a pilot lamp 506 are connected across the supply. A power supply 508 having a —15 volt D.C. output lead, a common lead, and a +15 volt D.C. output lead is connected to the A.C. power supply and provides the operational voltage for the FET operational amplifiers described above. In parallel with the amplifier power supply 508 is a timer circuit which provides automatic operation for the instrument including a single pole switch 510 which controls the power to a timing motor 512. The output shaft of the motor drives a cam assembly, 514 shown in phantom, which in turn controls a single pole micro switch 516. A relay coil 518 is connected in series with the micro switch 516 to the power supply and is energized when the timing cam assembly 514 closes the micro switch 516. The relay is a three pole, double throw type. Contact 522 of the relay 518 corresponds to switch 22 of the meter shown in the embodiment of FIG. 1 and is connected to the voltage follower amplifier. Contact 528 of the relay corresponds to switch 28 of FIG. 1 connected in series with the standard resistor 26 and relay contact 532 operates a time delay relay (not shown) controlling the recorder circuit. An open circuit pilot lamp 534 and a closed circuit pilot lamp 536 are provided in the circuit.

It will be appreciated that the number of relay contacts and cam actuating means may be changed in accordance with the particular circuit used. By way of example, the embodiment shown in FIG. 2 requires only a two contact relay.

Other modifications may be made to the basic circuit shown in FIG. 1, by the relocation of the various switches and circuit components as long as the operating procedures remain the same. Some of the modifications would include elimination of one pole of the switch, changing of the circuit to prevent current from flowing from the cell when the rate meter is turned off and changing of the circuit to eliminate the recording of spikes in the current during switching.

These and other modifications may be made to the corrosion meter in keeping with the scope of the invention as claimed.

We claim:

1. A method of determining corrosion rate using a three electrode corrosion rate instrument including establishing a corrosion potential between the test and reference electrode, storing this potential on a capacitor in series with the said electrodes, adding a polarizing potential to said corrosion potential, feeding the resulting potential to a potentiostat circuit to produce an output current proportional to the corrosion rate and reading said current on an instrument calibrated in units of corrosion.

2. A corrosion rate meter system comprising: a test electrode, a reference electrode, an auxiliary electrode, a storage means electrically interconnected between said test electrode and said reference electrode for storing electrical potential differences generated therebetween, means for providing a polarizing potential between said test electrode and said auxiliary electrode, a potentiostatic means responsive to said storage means potential, said polarizing potential and said reference electrode, a switch means for electrically connecting said polarizing potential means to said storage means and said potentiostatic means to said auxiliary electrode, and mutually exclusively controlling said electrical interconnection between said storage means and said reference electrode, and an electrical current meter means calibrated in units of corrosion rate electrically connected in series between said auxiliary electrode and said potentiostatic means.

3. The corrosion rate meter system of claim 2 wherein said storing means comprises a capacitor.

4. The corrosion rate meter system of claim 3 wherein said potentiostatic means comprises an operational amplifier one input of which is connected to the reference electrode and a second input of which is connected to the capacitor storing means.

5. The corrosion rate meter system of claim 4 further including a housing for said auxiliary, reference and test electrode and cable means for remotely interconnecting said auxiliary reference and test electrodes to said remaining system elements.

6. The corrosion rate meter system of claim 5 further including a third amplifier connected between said test electrode and said capacitor storage means, said third amplifier including a feedback path to said test electrode.

7. The corrosion rate meter system of claim 4 further including a power supply means and means for automatically cycling said switch means.

8. The corrosion rate meter system of claim 7 wherein said means for automatically cycling said switch means includes a timing motor, a cam operated switch, and a relay means.

9. The corrosion rate meter system of claim 4 further including a second operational amplifier connected between said reference electrode and said first operational amplifier.

10. The corrosion rate meter system of claim 4 wherein said means providing a polarizing potential comprises a battery and voltage divider circuit.

11. The corrosion rate meter system of claim 4 wherein said means providing a polarizing potential includes a voltage follower amplifier which is offset to the value of the polarizing voltage.

12. The corrosion rate meter of claim 4 further including a ground lead connected directly to said test electrode whereby internal resistance losses are coupled directly to said storage means.

13. The corrosion rate meter system of claim 4 wherein said operational amplifier is offset to the value of the polarizing voltage.

References Cited

UNITED STATES PATENTS

| 3,661,750 | 5/1972 | Wilson | 204—195 C |
| 3,661,751 | 5/1972 | Wilson | 204—195 C |
| 3,406,101 | 10/1968 | Kilpatrick | 204—1 T |
| 3,616,417 | 10/1971 | Wilson | 204—195 C |

FOREIGN PATENTS

| 868,012 | 4/1971 | Canada | 324—29 |

GERALD L. KAPLAN, Primary Examiner

U.S. Cl. X.R.

204—195 C; 324—71 R